United States Patent Office 2,732,181
Patented Jan. 24, 1956

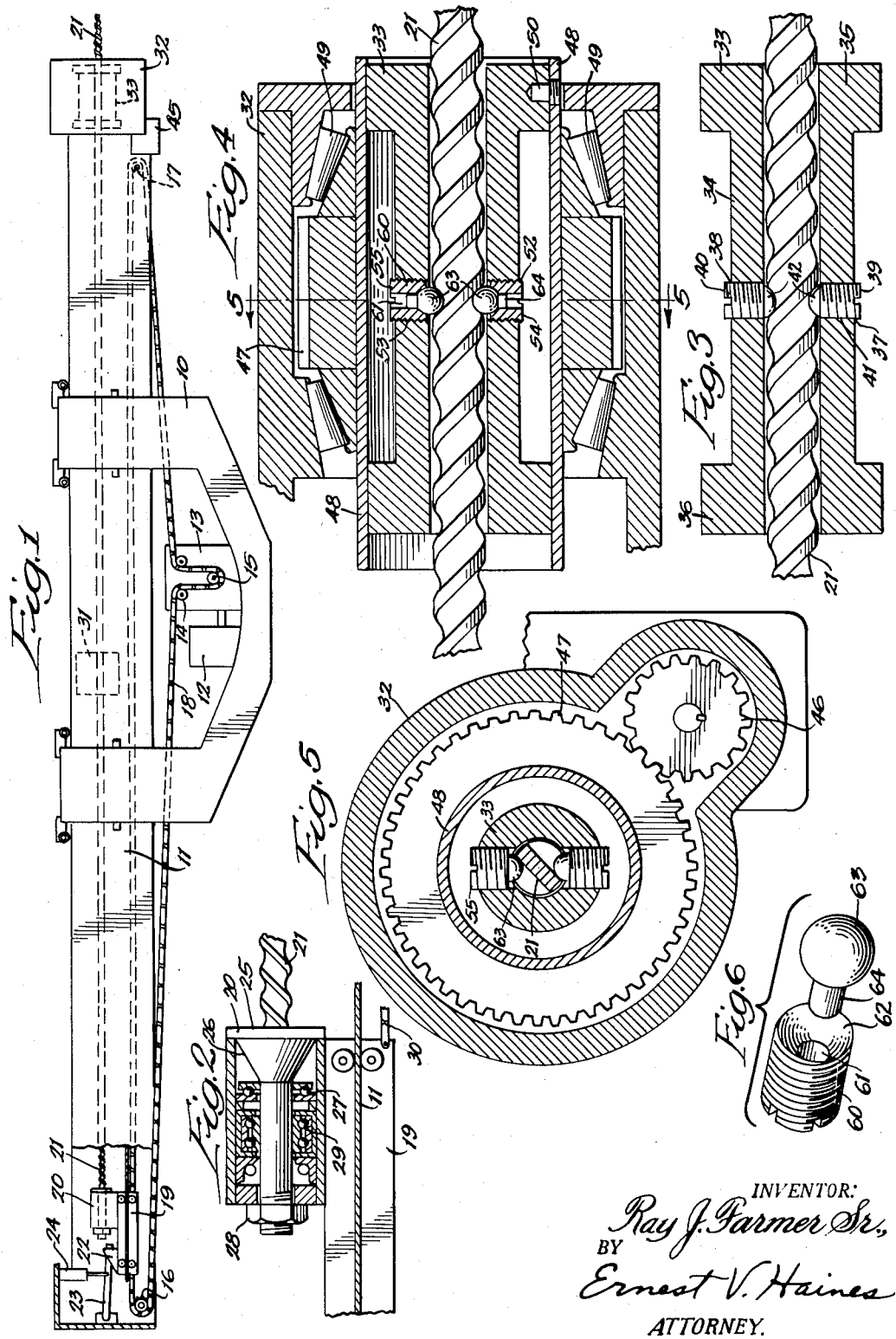

2,732,181
DRILLING MECHANISM

Ray J. Farmer, Sr., Carlsbad, N. Mex., assignor to International Minerals & Chemical Corporation, New York, N. Y., a corporation of New York Application June 9, 1952, Serial No. 292,556

3 Claims. (Cl. 255—46)

This invention relates to improvements in drilling mechanisms. More particularly, it relates to driving mechanisms for drill steels.

In the mining of coal, rock, hard mineral ores and the like, many types of drilling machines are in use. A common type of drilling apparatus provides for rotation of twisted drill steels by means of a gear. Torque is applied to the drill steel by contact between the flattened side of the twisted drill steel and the flat portion of the internal bore of the gear. If such mechanisms provide for continuous fed of the drill steel through the gear and boxing, the rate of feed is generally determined by the friction between the external housing and the boxing, which friction is adjustable by means of a thumb screw. This equipment creates marked vibration of the drill bit with consequent irregularity of drilled holes.

Further, deformations of the flights of an auger such as flattening or keyways being cut therein, causes serious loss of efficiency in the removal of the cuttings from the bore hole. In a slow speed drilling operation, cuttings removal is not a serious problem, but in drilling at high rates of speed, the failure to get cutting removal will cause the drill to choke and stick in the hole. Deformed augers, even when they do not stick or bend, leave material in the drill hole which makes it difficult or impossible to load the hole with powder.

It is a primary object of this invention to provide a new and improved drilling mechanism, useful in combination with a mining machine or similar power mechanism.

It is a further object of this invention to provide a drill chuck which eliminates any tendency of the bit to travel in an eccentric path.

It is also an object of this invention to prevent the tendency of bits to "walk" in starting holes.

It is still another object to provide a drill chuck which minimizes flexure of the drill steel being rotated at high speed and thus reduces metal fatigue and drill steel breakage.

It is still another object to provide a drill chuck which governs the drill path so as to reduce friction between the drill steel and the bore hole.

It is another object to provide a drill chuck which governs the drill bit so accurately, that the rate of penetration by the drill may be markedly increased.

It is another object to provide a drill chuck which will readily handle bits which drill clean, unobstructed holes.

It is still a further object to provide means for individual adjustment of the drill steel position so that the axis of the drill steel coincides with the axis of the chuck.

These and other objects of the invention will be apparent to those skilled in the art from the detailed description provided hereinafter.

Briefly, the high speed drilling apparatus comprises, a tubular drill support member or drill chuck, a rotating mechanism for driving said chuck, a drill or auger, mounted in said chuck and tension mechanism for applying a predetermined pressure axially of said drill. This drill chuck is provided at a point intermediate its ends, with positioning and driving means for said drill which are the sole points of contact with the drill made by the tubular drill support member and also the driving means for said drill. The contacts are of such a nature that the continuous automatic drill steel advancement is not hindered by friction at the points of contact.

The positioning and driving means comprises, two or more members extending in a radial direction through the chuck wall at any point along the axis of the chuck, and adapted to be independently adjustable for insertion into, or withdrawal from the axial channel of said support member or chuck. These positioning and driving means present a surface adapted to dovetail with the contact surface of the drill steel. The positioning and driving means may be studs threaded externally to cooperate with threaded apertures in the chuck wall either of cylindrical design or provided with integral hemispherical ends. The studs may also be adapted merely to act as retainers and guides for freely rotatable balls. When the positioning and driving means is of the convex curvature type, the point or points of contact are close to the central axis of the drill and in the valley between flights regardless of the pitch so long as the flights are at or near 180° to each other.

Drills or augers may be adapted for use in the drill chuck herein described and need not be twisted drill steels such as are illustrated in the hereinafter described drawings. A fabricated auger may be made up by welding a scroll to a cylindrical rod or pipe. The same effect can also be achieved by turning an auger out of solid stock on a lathe. Such fabricated surface to be operative, merely requires that the surface of the auger and of the studs meet at points presenting complementary surfaces to each other.

The device will be more fully understood from the following description and the drawings of the preferred embodiment of the invention which is given by way of illustration and without any intention of being limited thereto, wherein:

Figure 1 is a side elevational view of a drilling mechanism.

Figure 2 is a sectional view of the thrust carriage.

Figure 3 is a side elevational view of a chuck indicating the positioning of a stud securing means having a hemispherical tip.

Figure 4 is a sectional view of the chuck and chuck mounting.

Figure 5 is a sectional view along the line 5—5 of Figure 3.

Figure 6 is a perspective view of a stud and a cooperating rotatable ball contact means.

In the drawings, the reference numeral 10 indicates a frame member. Frame member 10 supports a boom 11, hydraulic motor 12 and chain drive mechanism 13, consisting of drive sprockets 14 and sprocket 15. Adjacent the ends of boom 11, there is mounted sprockets 16 and 17. On sprockets 14, 16 and 17, and sprocket 15, is mounted a drive chain 18. Chain 18 provides the actuation for a slide 19. Slide 19 supports a thrust carriage 20, adapted to exert longitudinal axial pressure on a drill auger 21. Slide 19 is provided with a stop 22, adapted to cooperate with a retainer member 23, which restricts movement of slide 19 until retainer member is withdrawn by hydraulic cylinder 24 in response to suitable actuation.

Thrust carriage 20 may be of any suitable design illustrated here as consisting of a head member 25 presenting a flat surface at right angles to the longitudinal axis of the drill auger 21. Head member 25 is tapered as at 26, to a tubular projection 27. Tubular projection 27 is threaded at the free end to receive retainer nut 28. Tubular projection 27 is of suitable cross section to be received within and supported by the inner race of a ball bearing mounting 29.

Fitted into boom 11 is an idler bearing 31, adapted to minimize flexing of drill auger 21. Secured to boom 11 is a housing or drill head 32 within which there is rotatably mounted drill chuck 33.

Drill chuck 33 is shown in Figure 3 by itself and in Figure 4 mounted in the drill head 32. Drill chuck 33 as shown in Figure 3 comprises a tubular body portion 34 and end members 35 and 36 which may or may not be integrally formed. End members 35 and 36 are centrally apertured to provide an axial channel of uniform diameter over the entire length of said chuck.

Tubular body member 34 is radially bored to form apertures as for example, opposed apertures 37 and 38. Apertures 37 and 38 are adapted with means for ready insertion or removal of drill steel positioning and driving means, as for example, with screw threads. As shown, threaded apertures 37 and 38 are of suitable size to receive such drill steel positioning and driving means as studs 39 and 40 which have a threaded body portion 41 and hemispherically shaped nose or tip portions 42.

Referring to Figures 4, 5 and 6, drill chuck 33 is shown mounted in the drill head and adapted with a preferred embodiment of the drill steel securing means. In these drawings, the housing or drill head 32 is secured to boom 11. Drill chuck 33 is mounted for rotation in drill head 32. Drill head or housing 32 is adapted with a prime mover means such as hydraulic motor 45 for driving a gear 46. Gear 46 drives a rotating gear 47 which is mounted on quill 48. Quill 48 is supported for rotation by tapered roller bearings 49. Quill 48 and chuck 33 are secured together for rotation by suitable quickly removable locking means 50 such as a threaded stud.

As shown in Figures 4, 5 and 6, the numeral 21 indicates the twisted drill steel which fits loosely within the axial channel of drill chuck 33. Chuck 33 illustrated receives in opposed threaded apertures 52 and 53, the preferred type of drill steel positioning and driving means 54 and 55, which project into the axial channel of said chuck from opposite sides and position in the convolutions or spiral channel of said twisted drill steel. The turning torque for rotation of the drill thus is applied to the side of the spiral of the drill steel by the studs.

Preferred type securing means 54 and 55, as shown in Figures 4, 5 and 6, comprises a stud member 60 having therein an axial bore 61. The axial bore is expanded at the top end of the stud into a recess 62, adapted to receive a segmental portion of a sphere. Stud 60 is provided with a cooperating ball member 63. Ball member 63 is provided with a cylindrical arm 64 of a diameter adapted for loose fit in the axial bore 61 of stud 60.

Drill chuck 33 and drive chain 18 are driven by independent driving means. Drive chain 18 through a gear reduction mechanism actuates slide 19 forcing the twisted drill steel to move axially through the drill chuck 33, while said drill chuck is being rotated by its independent driving means.

Having therefore duly described and illustrated the character of the invention, what is desired to be secured and claimed by Letters Patent is:

1. In a drilling apparatus, a boom, a rotatable auger type drill, thrust means supported by the boom and in contact with the end of said drill, said thrust means being adapted to exert longitudinal axial pressure on said drill, and a drill driving mechanism mounted on said boom, said drill driving mechanism comprising: a tubular drill chuck surrounding said drill; means rotatably supporting said drill chuck on said boom; power means for rotating said drill chuck about its longitudinal axis; a pair of diametrically oppositely positioned, threaded apertures in said tubular drill chuck; a threaded stud in each of said apertures; a drill engaging member on the inner end of each of said studs, said drill engaging members being positioned within adjacent valleys between flights of said drill whereby rotation of said chuck causes rotation of said drill, said studs being individually and independently adjustable radially of said chuck to position said drill with its longitudinal axis coinciding with the longitudinal axis of said chuck.

2. In a drilling apparatus, a boom, a rotatable auger type drill, thrust means supported by the boom and in contact with the end of said drill, said thrust means being adapted to exert longitudinal axial pressure on said drill, and a drill driving mechanism mounted on said boom, said drill driving mechanism comprising: a tubular quill rotatably mounted on said boom; a tubular drill chuck surrounding said drill, said chuck being telescoped within said quill and secured thereto for rotation therewith, said chuck having an intermediate portion of its length of reduced diameter to provide an annular space between said telescoped chuck and quill; power means for rotating said quill and drill chuck about their longitudinal axis; a pair of diametrically oppositely positioned, threaded apertures in said intermediate portion of said tubular drill chuck; a threaded stud in each of said apertures; a drill engaging member on the inner end of each of said studs, said drill engaging members being positioned within adjacent valleys between flights of said drill whereby rotation of said chuck causes rotation of said drill, said studs being individually and independently adjustable radially of said chuck to position said drill with its longitudinal axis coinciding with the longitudinal axis of said chuck.

3. In a high speed drilling apparatus, a boom, a rotatable auger type drill, thrust means supported by the boom and in contact with the end of said drill, said thrust means being adapted to exert longitudinal axial pressure on said drill, a drill driving mechanism comprising a tubular drill support member rotatably supported by said boom, means for rotating said drill support member about its longitudinal axis, said auger-type drill being positioned in said tubular drill support member, a pair of diametrically opposite, threaded, cylindrical channels whose longitudinal axes extend radially through the wall of said tubular drill support member, a threaded stud member in each of said channels having an axial bore expanded at one end to receive a segmental portion of a sphere, spherical ball members, each provided with a cylindrical arm of a diameter adapted for loosely fitting in each of said axial bores, said spherical ball members lying within said expanded ends of said bores and lying partially within the channels of said drill support member with the remainder in adjacent valleys between flights of the auger-type drill, said spherical ball members being independently adjustable radially with respect to the longitudinal axis of said tubular support member by rotation of said studs in their threaded cylindrical channels.

References Cited in the file of this patent

UNITED STATES PATENTS

| | | |
|---|---|---|
| 1,605,569 | Slater | Nov. 2, 1926 |
| 1,878,036 | Vodoz | Sept. 20, 1932 |
| 2,211,881 | Collett et al. | Aug. 20, 1940 |
| 2,554,276 | Stone | May 22, 1951 |